(12) United States Patent
Davidson et al.

(10) Patent No.: US 11,852,148 B2
(45) Date of Patent: Dec. 26, 2023

(54) REAL-TIME PUMP MONITORING WITH PRESCRIPTIVE ANALYTICS

(71) Applicant: GPM, Inc., Duluth, MN (US)

(72) Inventors: Gary Davidson, Northfield, MN (US); Sam Hodel, Duluth, MN (US); Peter Haines, Esko, MN (US)

(73) Assignee: GPM, Inc., Duluth, MN (US)

(*) Notice: Subject to any disclaimer, the term of this patent is extended or adjusted under 35 U.S.C. 154(b) by 1000 days.

(21) Appl. No.: 16/666,540

(22) Filed: Oct. 29, 2019

(65) Prior Publication Data

US 2021/0123443 A1 Apr. 29, 2021

(51) Int. Cl.
F04D 15/00 (2006.01)
H04W 84/18 (2009.01)
G07C 3/06 (2006.01)
F04D 15/02 (2006.01)
H04L 67/12 (2022.01)

(52) U.S. Cl.
CPC ..... F04D 15/0072 (2013.01); F04D 15/0088 (2013.01); F04D 15/0281 (2013.01); G07C 3/06 (2013.01); H04W 84/18 (2013.01); H04L 67/12 (2013.01)

(58) Field of Classification Search
None
See application file for complete search history.

(56) References Cited

U.S. PATENT DOCUMENTS 4,558,593 A * 12/1985 Watanabe ............. F04B 49/065
417/63
6,260,004 B1 * 7/2001 Hays ................... F04D 15/0088
702/183

(Continued)

FOREIGN PATENT DOCUMENTS

WO      1987000395 A1   1/1987
WO   WO 2017052578 A1 * 3/2017 ............. G08B 29/10
WO      2019028269 A2   2/2019

OTHER PUBLICATIONS

International Search Report, International Searching Authority, International Patent Application No. PCT/US20/58047, dated Jan. 26, 2021, 2 pages.
Written Opinion, International Searching Authority, International Patent Application No. PCT/US20/58047, dated Jan. 26, 2021, 6 pages.
Enhance Process Performance with Smart Solutions™; Flowrox; Apr. 2018; 4 pages.
Predict Plus™: Your Pump Wants to Talk to You™; PumpWorks; 2 pages.
Pump Portal®—Remote Pump Monitoring; See Water, Inc .; https://www.seewaterinc.com/pump-portal; retrieved on Jun. 16, 2020; 8 pages.

(Continued)

*Primary Examiner* — Charles E Anya
(74) *Attorney, Agent, or Firm* — Taft Stettinius & Hollister LLP

(57) ABSTRACT

A method according to one embodiment includes receiving real-time sensor data from a plurality of pump sensors, wherein each pump sensor of the plurality of pump sensors is configured to generate sensor data associated with at least one characteristic of the pump's operation, comparing the real-time sensor data to at least one threshold value, determining fault information in response to determining the real-time sensor data is outside of one or more of the at least one threshold value, determining a real-time operating point of the pump on a pump performance curve associated with the pump based on the real-time sensor data, displaying, on a graphical user interface of an administrative device, the real-time operating point of the pump on the pump performance curve, and displaying, on the graphical user interface of the administrative device, the fault information in real time.

20 Claims, 11 Drawing Sheets

(56) References Cited

U.S. PATENT DOCUMENTS

| | | | |
|---|---|---|---|
| 6,709,240 B1* | 3/2004 | Schmalz | F04B 49/065 |
| | | | 318/438 |
| 7,308,322 B1 | 12/2007 | Discenzo et al. | |
| 9,013,322 B2 | 4/2015 | Roberson et al. | |
| 10,363,197 B2 | 7/2019 | Potucek et al. | |
| 2009/0187382 A1 | 7/2009 | Conroy et al. | |
| 2009/0287339 A1* | 11/2009 | Shimshi | G05B 23/0272 |
| | | | 700/110 |
| 2011/0241888 A1 | 10/2011 | Lu et al. | |
| 2014/0379300 A1 | 12/2014 | Devine et al. | |
| 2017/0097647 A1 | 4/2017 | Lunani et al. | |
| 2018/0181086 A1* | 6/2018 | Kostyukov | G05B 23/0232 |
| 2018/0209415 A1* | 7/2018 | Zhang | F04B 17/05 |
| 2019/0121343 A1 | 4/2019 | Cella et al. | |
| 2020/0183377 A1* | 6/2020 | Sarah | G05B 23/0281 |

OTHER PUBLICATIONS

Real-time Monitoring for Cost, Flow, Depth, Efficiency, and More; Pumpsight; https://www.pumpsight.com/#connectivity; retrieved on Jun. 16, 2020; 7 pages.

Online Process Monitoring, Maintenance and Analysis; Flowrox; https://www.flowrox.com/products_services/smart_solutions/smart_portal/flowrox_malibu_portal; retrieved on Jun. 16, 2020; 9 pages.

* cited by examiner

REAL-TIME PUMP MONITORING WITH PRESCRIPTIVE ANALYTICS

BACKGROUND

Rotating equipment such as pumps are often monitored using various sensing devices to measure parameters such as flow rate, pressure, speed, temperature, motor amperage, and other pump characteristics. The sensed data may be monitored to determine whether a fault has occurred within the pump, and when a fault has been detected, the monitoring system may issue a fault alert to prompt maintenance personnel to attend to the equipment. However, there remains a need for a system with improved pump monitoring in real time that provides prescriptive analytics.

SUMMARY

One embodiment is directed to a unique system, components, and methods for real-time pump monitoring with prescriptive analytics. Other embodiments are directed to apparatuses, systems, devices, hardware, methods, and combinations thereof for real-time pump monitoring with prescriptive analytics. This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
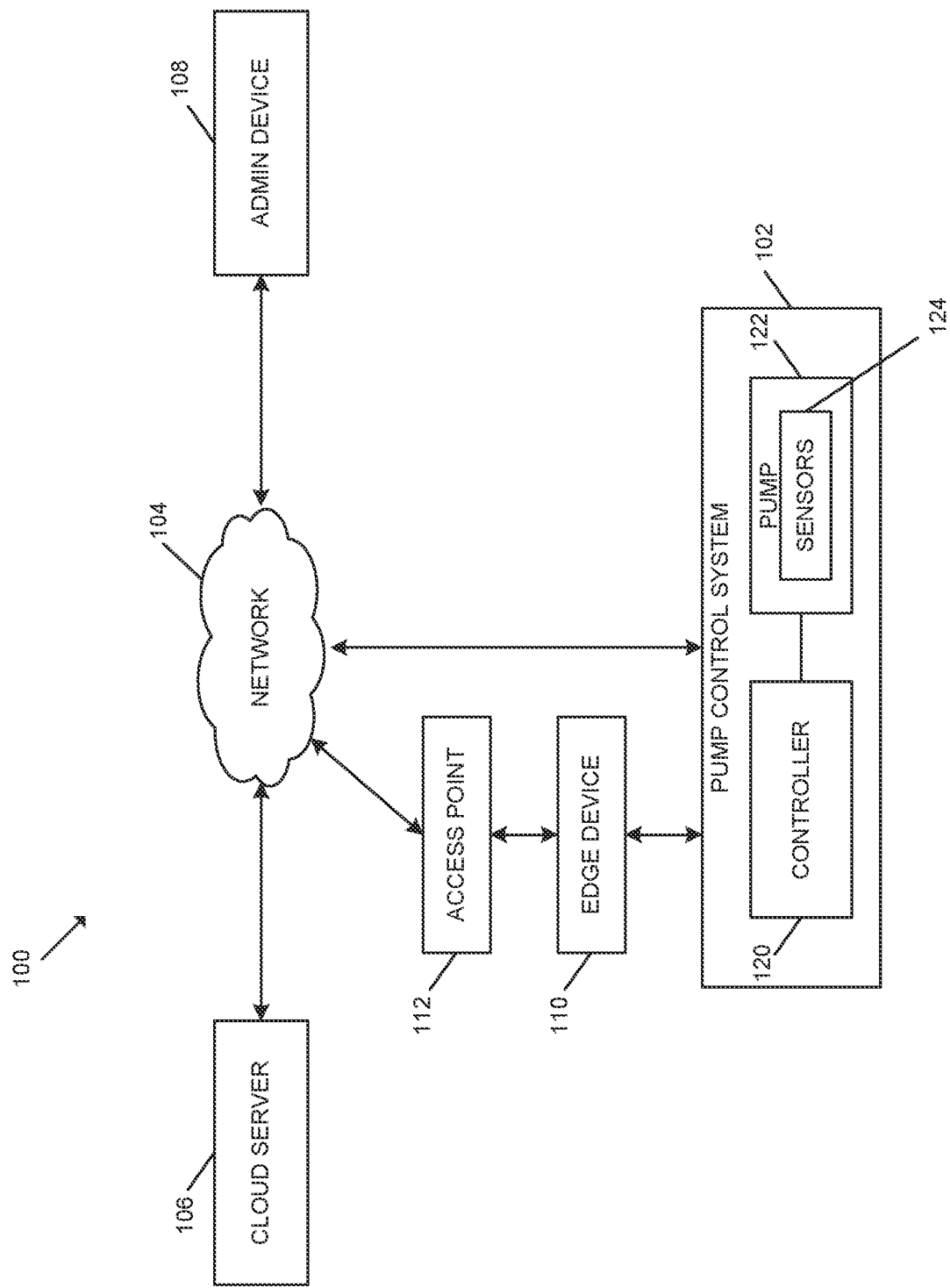
FIG. 1 is a simplified block diagram of at least one embodiment of a system for real-time pump monitoring with prescriptive analytics.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for facilitating real-time pump monitoring with prescriptive analytics includes a pump control system 102, a network 104, a cloud server 106, an administrative device 108, an edge device 110, and an access point 112. Further, in some embodiments, the pump control system 102 may include a controller 120, a pump 122, and one or more sensors 124. As described in detail below, the system 100 allows for the real-time measurement and display of sensor data (e.g., on a pump performance curve corresponding with the pump 122) in addition to identifying and informing an administrator of any pump faults in real time (e.g., in conjunction with the display of the sensor data). It should be appreciated that the terms "real-time" and "real time" as used herein allow for the typical latency associated with calculating a derived value and/or transmitting data between devices/components (e.g., to the administrative device 108 for real-time display).

In particular, various operational characteristics of the pump 122 may be measured by sensors 124 coupled to and/or otherwise associated with the pump 122. It should be appreciated that typical limits are often placed (e.g., by the pump manufacturer) on the operation of the pump 122 to ensure that the pump 122 operates safely and within a desired pump envelope. Such data may be reflected in a pump performance curve for the particular pump 122, and the performance curve for each pump 122 may be unique depending on the particular structural, mechanical, electrical, and/or other relevant characteristics of that pump 122. If the operational state of the pump 122 goes outside of an acceptable range as indicated by the relevant sensor data (e.g., high temperature or low flow rate), an alarm may be triggered to an operator or administrator. For example, in some embodiments, the alarm may indicate to an operator or administrator that the measured parameter is out of range and that some remedial action should be taken to prevent damage to the pump 122 and/or other components of the pump system. Depending on the particular circumstances, the remedial action may need to be taken immediately (e.g., forced shut down) or may be able to be postponed until a more convenient time (e.g., preventative maintenance/repairs).

As described herein, in the illustrative embodiment, sensor data or a derived version thereof may be trended over time to compare acceptable baseline operation of the pump 122 to the current operation of the pump 122 and thereby ascertain whether the pump 122 is currently operating in a safe or normal state or the pump 122 is currently operating in an abnormal or out-of-range state. As such, it should be appreciated that the system 100 may leverage various threshold values that serve as bounds for acceptable pump operation. Depending on the particular embodiment, the threshold values may be static and predefined by the system 100, dynamically updated by the system 100 (e.g., using machine learning techniques), and/or modifiable by the administrative device 108 or otherwise user-editable. Further, in some embodiments, the threshold values may be determined based on the performance curve for that particular pump 122. Additionally, in some embodiments, one or more of the threshold values may correspond with one or more bounds superimposed on a representative characteristic curve and, therefore, one or more of the alarms/messaging described herein may be a result of those graphically imposed bounds being surpassed on the curve.

In the illustrative embodiment, the system 100 is able to both ascertain the existence of a fault and also provide additional fault information to the administrative device 108 to facilitate remediation of the fault. Specifically, in some embodiments, the system 100 may determine fault information including the type of fault, the severity of the fault, potential causes of the fault, and prescriptive recommendations for proactively addressing the fault before damage occurs to the pump 122 and/or ancillary components. Additionally, as described below, some or all such fault information may be conveniently displayed for the administrator on the administrative device 108 (e.g., locally or remotely) in real-time and updated over time based on sensed data as pump conditions vary. Further, the administrative device 108 may also display the operating state of the pump 122 on its pump performance curve in real time. It should be appreciated that the fault information and/or sensor data may be displayed on a graphical user interface of the administrative device 108 in any suitable format (e.g., as gauges, bar graphs, spectrum graphs, data tables, etc.).

Figure 5:
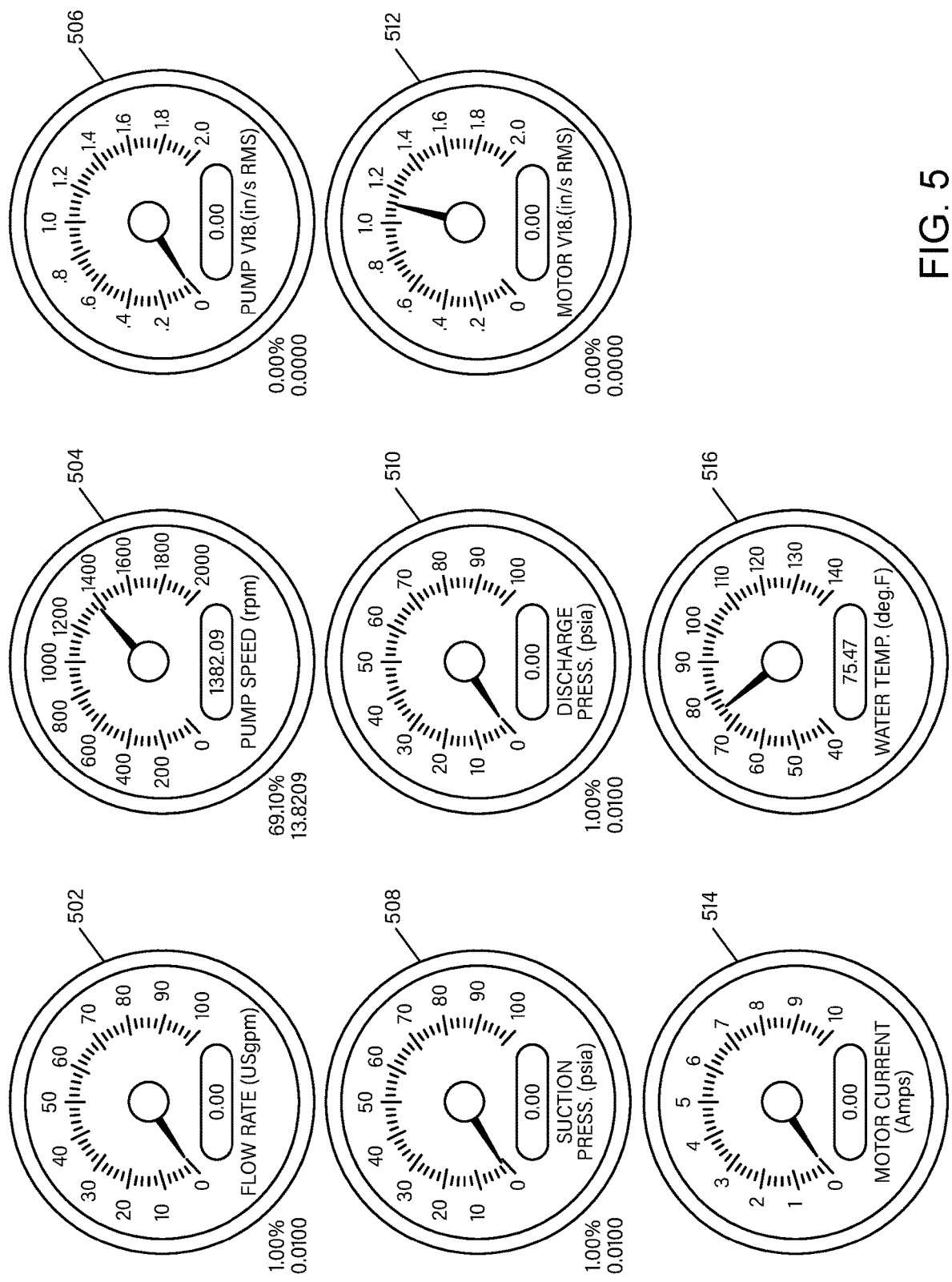
FIGS. 5-11 illustrate screen captures of at least one embodiment of a graphical user interface of the administrative device of FIG. 1.

For example, in some embodiments, the real-time sensor data may be depicted as analog gauges as shown in FIG. 5. In particular, as illustrated in FIG. 5, the graphical user interface of the administrative device 108 may graphically depict a flow rate gauge 502 that graphically represents the real-time flow rate (e.g., volumetric flow rate) of the pump 122 (e.g., in gallons per minute) as measured by corresponding sensors 124, a pump speed gauge 504 that graphically represents the real-time pump speed (e.g., in rotations per minute) as measured by corresponding sensors 124, a pump vibration gauge 506 that graphically represents the real-time vibration of the pump 122 (e.g., in inches per second, RMS) as measured by corresponding sensors 124, a suction pressure gauge 508 that graphically represents the real-time suction pressure of the pump 122 (e.g., in pounds per square inch or pounds per square inch absolute) as measured by corresponding sensors 124, a discharge pressure gauge 510 that graphically represents the real-time discharge pressure of the pump 122 (e.g., in pounds per square inch or pounds per square in absolute) as measured by corresponding sensors 124, a motor vibration gauge 512 that graphically represents the real-time vibration of the pump motor (e.g., in inches per second, RMS) as measured by corresponding sensors 124, a motor current gauge 514 that graphically represents the real-time current of the pump motor (e.g., in amperes) as measured by corresponding sensors 124, and/or a fluid temperature gauge 516 that graphically represents the real-time temperature of fluid (e.g., water, a slurry, and/or other fluid(s)) within the pump (e.g., in degrees Fahrenheit) as measured by corresponding sensors 124. It should be appreciated that any units of measure referenced herein are provided by way of example and are not intended to be limiting. As such, data may be measured in metric, imperial, and/or other units of measure depending on the particular embodiment. Further, in some embodiments, the sensed and/or utilized data may include raw data, data represented in standard units, and/or data represented in units different from standard units of measure. For example, although vibration is described above in reference to RMS, it should be appreciated that vibration data may be measured, described, and/or utilized in reference to its mean, absolute value, square, or other derived version(s) thereof. Similarly, it may be measured, described, and/or utilized in the time domain and/or the frequency domain, and phase measurement and/or ultrasonic characteristics may be considered, for example.

It should be appreciated that the pump 122 is predominantly described herein as a centrifugal pump style of pump; however, it should be appreciated that the techniques described herein may be applied to other types of pumps 122 in other embodiments. For a centrifugal pump, relevant pump characteristics include, for example, the total amount of energy (head) that the pump 122 imparts to the fluid as a function of the flow rate through the pump 122, the efficiency of the pump 122 at various flow rates, the amount of power being absorbed by the pump 122, the net positive suction head (NPSH) required by the pump 122 in order to operate cavitation-free, and the net positive suction head available (NPSHA) to the pump 122. Additionally, net positive suction head required (NPSHR) may serve as an indicator of how much fluid head or pressure must be present at the pump inlet to suppress cavitation. Additionally, although the pump 122 is described herein as a pump, it should be appreciated that the techniques described herein may be applied to other types of rotating equipment. For example, in other embodiments, the pump 122 may instead be embodied as a motor, engine, compressor, or other type of rotating machine.

In the some embodiments, the sensors 124 of the pump control system 102 may be configured to transmit the sensed data to the controller 120 for processing thereon. For example, in some embodiments, the controller 120 may be embodied as a programmable linear controller (e.g., located in a control panel) configured to received and process the sensor data. As described herein, the pump control system 102 (e.g., via the controller 120) may be configured to transmit the sensor data to the cloud server 106 for further processing via suitable communication protocols. For example, in some embodiments, the controller 120 may be interfaced with an edge device 110 that is communicatively coupled with the access point 112, which may be communicatively coupled to the cloud server 106 via the network 104. In particular, the access point 112 may be embodied as an 802.11-compliant wireless router capable of communicating with the cloud server 106 via the Internet. In other embodiments, the pump control system 102 may be configured to communicate directly with the network 104 (e.g., via cellular or other telecommunication circuitry of the controller 120). Further, in yet other embodiments, the pump control system 102 may be configured to communicate directly with the access point 112 without communicating with an intervening edge device 110. In some embodiments, it should be appreciated that the pump control system 102 of FIG. 1 may be embodied as, or include one or more features described in reference to, the pump control system 102 of FIG. 3.

It should be appreciated that the cloud server 106 may be embodied as any type of device or collection of devices suitable for performing the functions described herein. More specifically, the cloud server 106 may analyze the sensor data to determine whether a fault condition has occurred (or is likely to occur) and determine the relevant fault information associated with that fault. Further, the cloud server 106 may determine the real-time operating point of the pump 122 on the pump performance curve associated with that pump 122. It should be appreciated that the cloud server 106 may utilize any suitable algorithm for performing the functions described herein. Additionally, although some of the functions of the system 100 are described herein in reference to performance by the cloud server 106, it should be appreciated that one or more of those functions may be performed by other device(s) of the system 100 in other embodiments (e.g., the pump control system 102 and/or the administrative device 108).

It should be further appreciated that, in some embodiments, the cloud server 106 may be embodied as a virtual computing environment residing "on" a computing system (e.g., a distributed network of devices) in which various virtual functions (e.g., Lambda functions, Azure functions, Amazon Web Services cloud functions, Google cloud functions, and/or other suitable virtual functions) may be executed corresponding with the functions of the cloud server 106 described herein. For example, when an event occurs (e.g., data is transferred to the cloud server 106 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of particular data is made (e.g., via an appropriate interface to the cloud server 106), the appropriate virtual function(s) may be executed to perform the actions before eliminating the instance of the virtual function(s). Although the cloud server 106 is described herein as a cloud-based device, it should be appreciated that the cloud server 106 may be embodied as, or include, one or more servers located "outside" of a cloud computing environment in other embodiments.

The network 104 may be embodied as any type of communication network(s) capable of facilitating communication between the various devices of the system 100. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), ad hoc networks, long-range wireless communication networks, or a combination thereof.

The administrative device 108 may be embodied as any type of computing device that is configured to receive and display notification messages, sensor data, fault information, operating point data, and/or related information from the cloud server 106 regarding the real-time operation of the pump 122. For example, in some embodiments, a user of the administrative device 108 may execute an application that displays a graphical user interface for visualization of the relevant data (e.g., a smartphone application or a client-side user interface to a web-based application/service of the cloud server 106). It should further be appreciated that, in some embodiments, the particular data viewable by the user may vary depending on the role of the user (e.g., operations team, operations manager, analyst, system engineer, etc.).

It should be appreciated that the cloud server 106, the administrative device 108, and/or the edge device 110 may be embodied as a computing device similar to the computing device 200 described below in reference to FIG. 2. For example, in the illustrative embodiment, each of the cloud server 106, the administrative device 108, and the edge device 110 includes a processing device 202 and a memory 206 having stored thereon operating logic 208 for execution by the processing device 202 for operation of the corresponding device. Additionally, it should be appreciated that the pump control system 102 may include features similar to the features described below in reference to the computing device 200 of FIG. 2.

Although only pump control system 102, one cloud server 106, one administrative device 108, one edge device 110, and one access point 112 are shown in the illustrative embodiment of FIG. 1, the system 100 may include multiple pump control systems 102, cloud servers 106, administrative devices 108, edge devices 110, and/or access points in other embodiments. For example, in some embodiments, a user of a particular administrative device 108 may visualize data representative of the operating conditions of multiple pumps 122.

Figure 2:
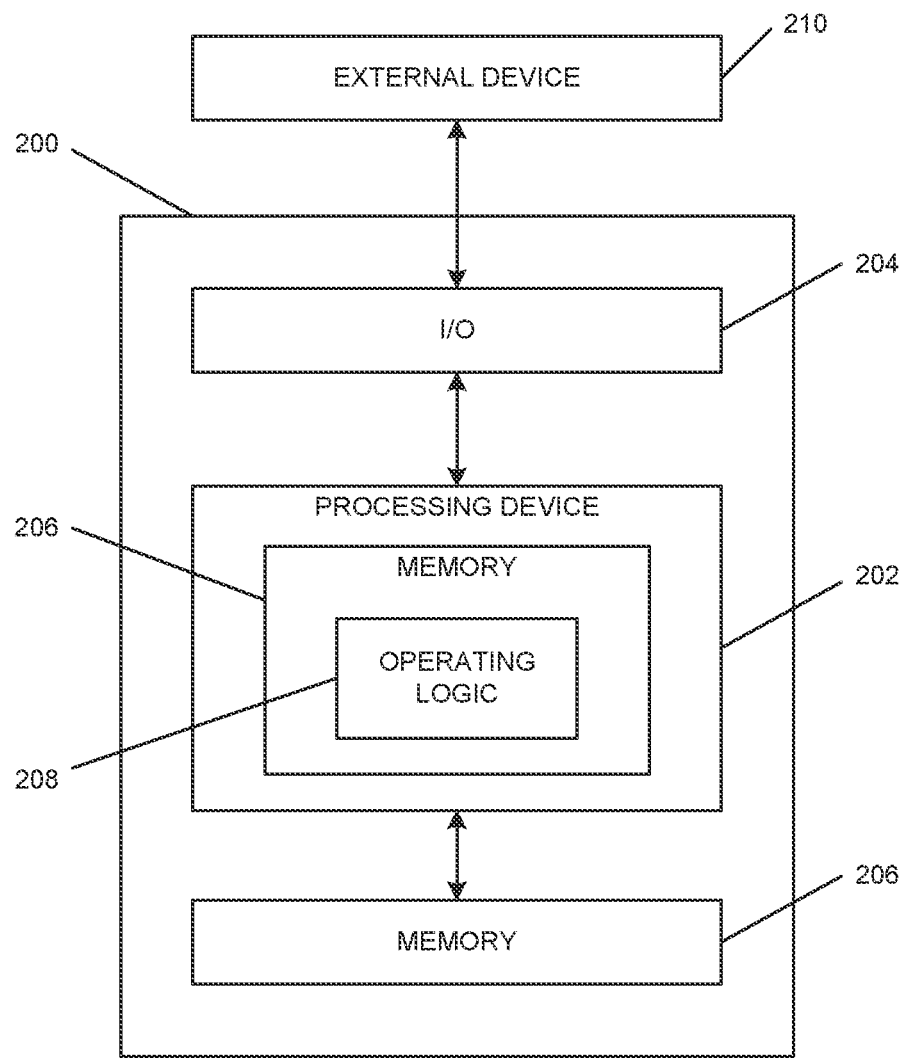
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of a cloud server, administrative device, and/or edge device that may be utilized in connection with the cloud server 106, the administrative device 108, and/or the edge device 110 illustrated in FIG. 1. Depending on the particular embodiment, the computing device 200 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the pump control system 102, the cloud server 106, the administrative device 108, the edge device 110, and/or the access point 112. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
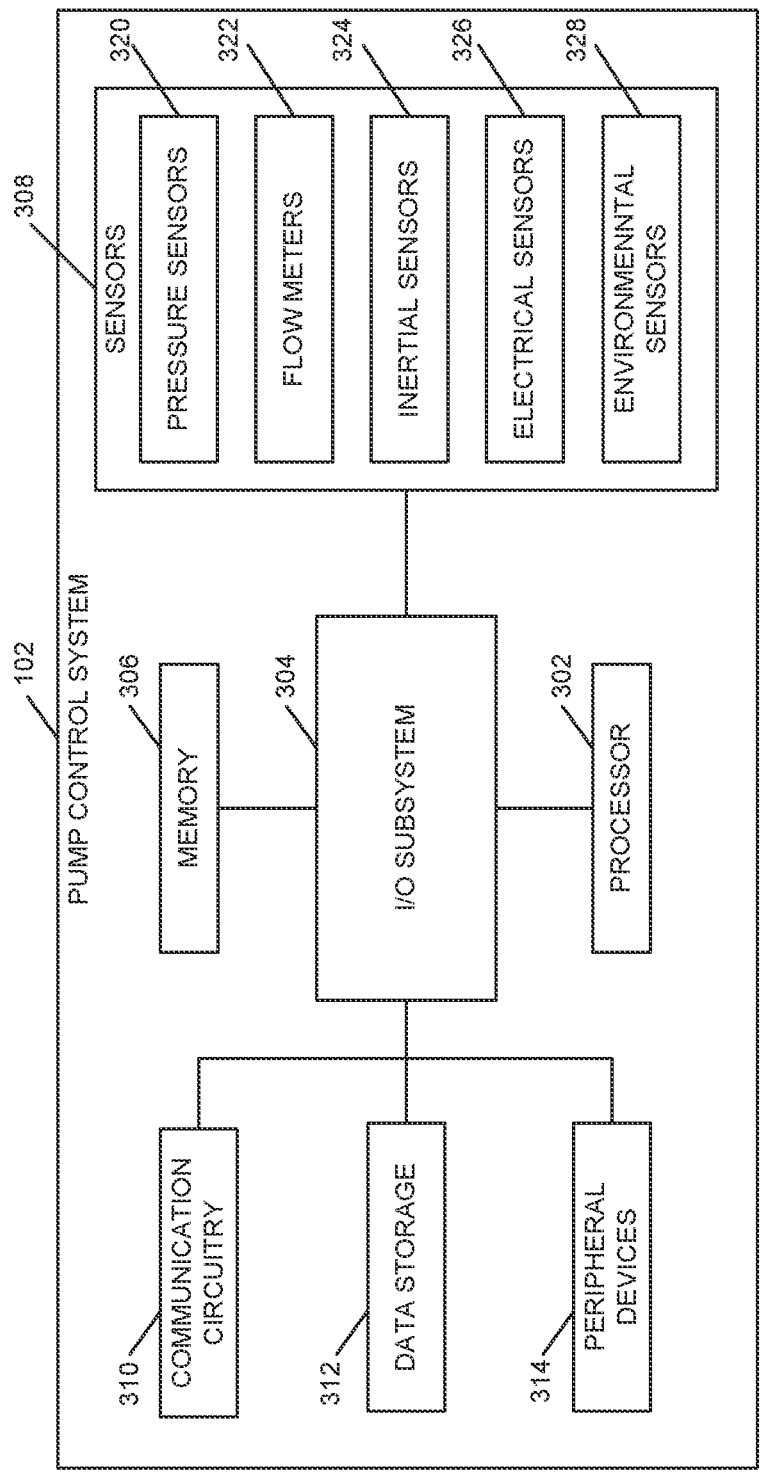
FIG. 3 is a simplified block diagram of at least one embodiment of the pump control system of FIG. 1.

Referring now to FIG. 3, a simplified block diagram of at least one embodiment of the pump control system 102 is shown. The illustrative pump control system 102 includes a processor 302, an input/output ("I/O") subsystem 304, a memory 306, one or more sensors 308, communication circuitry 310, and data storage 312. Further, in some embodiments, the pump control system 102 may include one or more peripheral devices 314. It should be appreciated that one or more of the components of the pump control system 102 described herein may be embodied as, or form a portion of, one or more embedded controllers and/or integrated circuits. For example, in some embodiments, the processor 302, the I/O subsystem 304, the memory 306 and/or other components of the pump control system 102 may be embodied as, or form a portion of, a microcontroller or SoC. Further, depending on the particular embodiment, the components of the pump control system 102 may be closely positioned to one another or distributed throughout the pump control system 102 (i.e., separated from one another).

The processor 302 may be embodied as any type of processor(s) capable of performing the functions described herein. In particular, the processor 302 may be embodied as one or more single or multi-core processors, microcontrollers, or other processor or processing/controlling circuits. For example, in some embodiments, the processor 302 may include or be embodied as an arithmetic logic unit (ALU), central processing unit (CPU), digital signal processor (DSP), and/or another suitable processor(s). The processor 302 may be a programmable type, a dedicated hardwired state machine, or a combination thereof. One or more processors 302 with multiple processing units may utilize distributed, pipelined, and/or parallel processing in various embodiments. Further, the processor 302 may be dedicated to performance of just the operations described herein, or may be utilized in one or more additional applications. In the illustrative embodiment, the processor 302 is of a programmable variety that executes algorithms and/or processes data in accordance with operating logic as defined by programming instructions (such as software or firmware) stored in the memory 306. Additionally or alternatively, the operating logic for the processor 302 may be at least partially defined by hardwired logic or other hardware. Further, the processor 302 may include one or more components of any type suitable to process the signals received from input/output devices or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable variety, such as a disk, tape, memory stick, cartridge, and/or other suitable portable memory. In operation, the memory 306 may store various data and software used during operation of the pump control system 102 such as operating systems (e.g., real-time operating systems (RTOS)), applications, programs, libraries, and drivers. The memory 306 is communicatively coupled to the processor 302 via the I/O subsystem 304, which may be embodied as circuitry and/or components to facilitate input/output operations with the processor 302, the memory 306, and other components of the pump control system 102. For example, the I/O subsystem 304 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. Depending on the particular embodiment, the memory 306 may be included with the processor 302 and/or coupled to the processor 302 depending on the particular embodiment. For example, in some embodiments, the processor 302, the I/O subsystem 304, the memory 306, and/or other components of the pump control system 102 may form a portion of a system-on-a-chip (SoC) and be incorporated on a single integrated circuit chip.

The sensors 308 are configured to generate sensor data (e.g., by virtue of one or more signals), which may be interpreted by the processor 302 to determine one or more characteristics associated with the pump control system 102 and/or the associated pump 122. By way of example, the sensors 308 may detect various characteristics of the physical environment of the associated pump 122 (internal and/or external to the pump 122), electrical characteristics of the associated pump 122, electromagnetic characteristics of the associated pump 122 or its surroundings, and/or other suitable characteristics. In particular, in the illustrative embodiment, the sensors 308 may include one or more pressure sensors 320, flow meters 322, inertial sensors 324, electrical sensors 326, and/or environmental sensors 328. It should be appreciated that each the sensors 308 may be positioned in any suitable location (e.g., within the pump control system 102, the associated pump 122, and/or elsewhere) and configured to sense various pressures, flows, and/or other characteristics associated with the pump control system 102 and/or the associated pump 122, which may vary depending on the particular embodiment. It should be further appreciated that, in some embodiments, the sensors 308 may be configured to generated data associated with one or more other characteristics of the system 100 (e.g., external to the pump control system 102 and/or the pump 122), which may be considered by the system 100 (e.g., in conjunction with historical data and/or other relevant data) in performing the functions described herein. Further, in some embodiments, it should be appreciated that one or more of the sensors 308 may be configured to transmit generated sensor data directly to the edge device 110 and/or other device(s) of the system 100.

Each of the pressure sensors 320 may be configured to generate sensor data representative of a corresponding pressure within the pump 122 or at another location of the pump system (e.g., within or at another component of the system). For example, in some embodiments, the pressure sensors 320 may include one or more suction pressure transducers and/or one or more discharge pressure transducers. Additionally or alternatively, it should be appreciated the pressure sensors 320 may be configured to sense various pressures at other suitable locations of the pump 122. Each of the flow meters 322 may be configured to generate sensor data representative of a corresponding flow rate of material at one or more locations within the pump 122 or pump system. In some embodiments, one or more of the flow meters 322 may be considered to generate data that may be used to determine flow rate based, for example, on line velocity, change in sump/tank level over time (e.g., with a known or determinable sump/tank size), and/or other characteristics of the pump system. Each of the inertial sensors 324 (e.g., accelerometers, gyrometers, etc.) may be configured to generate sensor data representative of a corresponding inertial characteristic of the pump 122. For example, in some embodiments, the inertial sensors 324 may include accelerometers positioned on the pump frame and/or motor frame and configured to detect vibrations associated with that equipment. Each of the electrical sensors 326 may be configured to generate sensor data representative of a corresponding electrical characteristic of the pump 122. For example, in some embodiments, the pump speed may vary and be measured by a variable frequency drive, and the electrical sensors 326 may be configured to measure motor amperage, voltages, power factor, electrical energy, power quality, and/or other electrical characteristics. As such, it should be appreciated that, in some embodiments, the electrical sensors 326 may include one or more power sensors or power-related sensors. Each of the environmental sensors 328 may be configured to generate sensor data representative of an environmental characteristic of the pump 122. For example, in some embodiments, the environmental sensors 328 may include one or more temperature sensors configured to measure fluid temperature within the pump 122, the temperature of the rotating apparatus/machine (or component thereof), and/or other relevant system temperatures. Further, in some embodiments, the environmental sensors 328 may include, for example, one or more slurry density meters, viscometers, and/or other fluid-related sensors.

It should be appreciated that the sensors 308 may be embodied as, or otherwise include, other sensors in other embodiments. For example, in various embodiments, the sensors 308 may be embodied as, or otherwise include, other environmental sensors, inertial sensors, proximity sensors, optical sensors, electromagnetic sensors, audio sensors, motion sensors, piezoelectric sensors, cameras, fluid/material quality sensors (e.g., oil quality sensors), and/or other types of sensors. It should be appreciated that, in some embodiments, additional and/or alternative sensors 308 other than those described above may be included in the pump control system 102. Of course, the pump control system 102 may also include components and/or devices configured to facilitate the use of the sensors 308.

It should be further appreciated that the monitoring of various characteristics and/or properties of the pump control system 102, the pump 122, and/or other aspects of the system 100 may involve the monitoring of multiple sensor inputs, which may be analyzed in conjunction with other data (e.g., historical data, contextual data, and/or other relevant information). Further, some characteristics may be analyzed using one or more different types of sensors described herein depending on the particular embodiment. For example, in some embodiments, the system 100 may be configured to monitor one or more mechanical seals of the pump 122 for performance, condition, and/or its relationship to prescriptive analytics using one or more pressure sensors, temperature sensors, conductivity sensors, float switches, and/or other suitable sensors. Further, in some embodiments, the system 100 may calculate power based on a signal (e.g., in Watts) from a VFD, power monitor, control system, and/or other component, and in other embodiments, the system 100 may calculate power based on three phase (or single phase) current, voltage, and power factor (e.g., applying a constant to arrive at power).

The communication circuitry 310 may be embodied as any communication circuitry, transceiver, device, or collection thereof, capable of enabling communication between the pump control system 102 and other remote devices (e.g., the edge device 110, the access point 112, and/or the cloud server 106) over a network (e.g., the network 104). The communication circuitry 310 may be configured to use any one or more communication technologies (e.g., wireless or wired communications) and associated protocols (e.g., Ethernet, Bluetooth®, WiMAX, etc.) to effect such communication.

The data storage 312 may be embodied as any type of device or devices configured for short-term or long-term storage of data such as, for example, memory devices and circuits, memory cards, hard disk drives, solid-state drives, or other data storage devices. The data storage 312 and/or the memory 306 may store various data during operation of the pump control system 102 useful for performing the functions described herein.

The peripheral devices 314 may include any number of additional peripheral or interface devices. For example, in some embodiments, the peripheral devices 314 may include a keyboard, mouse, display, status indicator, diagnostic tool, speaker, microphone, and/or one or more other suitable peripheral devices. In some embodiments, the peripheral devices 314 may include any devices to which the pump control system 102 is to output data.

It should be appreciated that the pump control system 102 may include additional or alternative components, such as those commonly found in an embedded control system, for example, in other embodiments. Further, in some embodiments, one or more of the components of the pump control system 102 described herein may be omitted from the pump control system 102 associated with a particular pump 122 (e.g., peripheral devices 314).

Figure 4:
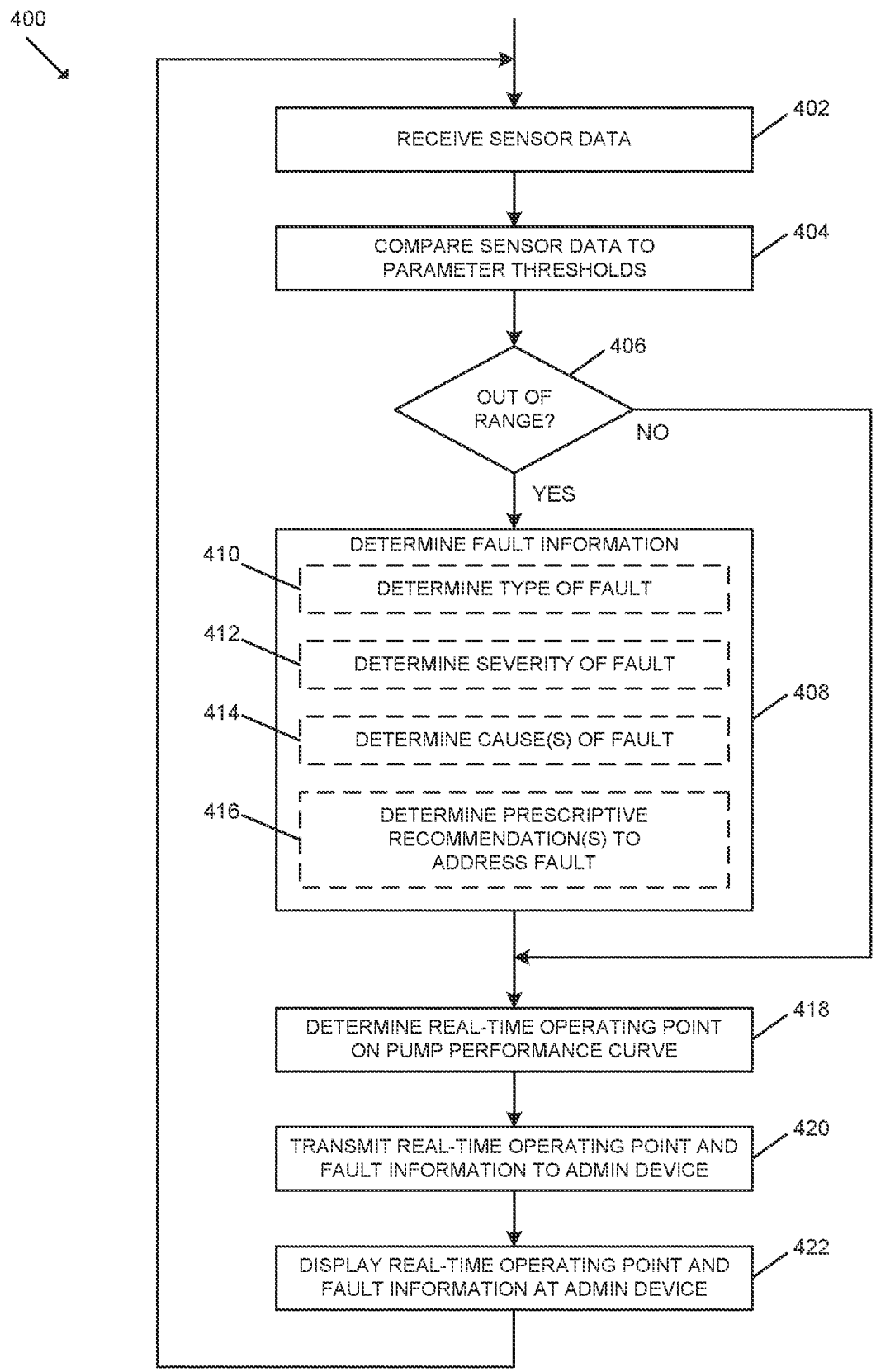
FIG. 4 is a simplified flow diagram of at least one embodiment of a method for real-time pump monitoring with prescriptive analytics using the system of FIG. 1.

Referring now to FIG. 4, in use, the system 100 may execute a method 400 for real-time pump monitoring with prescriptive analytics. It should be appreciated that the particular blocks of the method 400 are illustrated by way of example, and such blocks may be combined or divided, added or removed, and/or reordered in whole or in part depending on the particular embodiment, unless stated to the contrary. The illustrative method 400 begins with block 402 in which the cloud server 106 receives sensor data generated by the sensors 308 of the pump control system 102 in real time. In particular, in some embodiments, the pump control system 102 may receive the sensor data, which is transmitted to the cloud server 106. It should be appreciated that, depending on the particular embodiment, the sensor data may be transmitted to the cloud server 106 in a raw data form or a processed/derived version thereof. As such, for brevity of the description, the sensor data is simply described as "sensor data" and intended to be directed to any such format unless stated to the contrary.

In block 404, the cloud server 106 compares the real-time sensor data to parameter thresholds. For example, as described above, each particular pump 122 may include various bounds/thresholds for acceptable pump operation, which may be based on the performance curve for that particular pump 122. As such, the cloud server 106 may compare the real-time sensor data to the corresponding threshold values to determine whether that particular sensed value is within the relevant threshold bounds or outside of the threshold bounds (e.g., over or below an acceptable range). In some embodiments in which the pump 122 is a centrifugal pump, the operating percentage of QBEP, the operating efficiency, and the operating NPSH margin, for example, may be calculated and compared to relevant thresholds and/or reference data. In other embodiments involving centrifugal pumps, it should be appreciated that other characteristics may be calculated and compared as described herein.

It should be appreciated that one or more of the threshold values may be derived values and not values associated with direct sensor inputs. As such, it should be appreciated that, in some embodiments, the real-time sensor data may not be compared directly to a particular parameter threshold. Rather, the real-time sensor data may be analyzed and/or processed to generate derived real-time sensor data, which may be compared to various associated bounds/thresholds. As such, for simplicity and brevity of the description, it should be appreciated that "real-time sensor data" may be used herein as encompassing both the real-time sensor data itself and data derived therefrom unless the context of the description clearly dictates otherwise.

If the cloud server 106 determines, in block 406, that the real-time sensor data is outside of the threshold bounds, the method 400 advances to block 408 in which the cloud server 106 determines corresponding fault information. In particular, in the illustrative embodiment, the cloud server 106 analyzes the sensor data (e.g., over time) to both ascertain the existence of a fault and also provide additional fault information to facilitate remediation of the fault. In particular, in block 410, the cloud server 106 may determine the type of the fault corresponding with the pump parameter's deviation from the acceptable range of operation. In block 412, the cloud server 106 may determine the severity of the fault. For example, the cloud server 106 may distinguish those faults that require immediate action (e.g., forced shutdown) from those faults whose remediation can be delayed (e.g., preventative maintenance). In block 414, the cloud server 106 may also determine the potential causes of the fault. Further, in block 416, the cloud server 106 may determine one or more prescriptive recommendations for proactively addressing the fault before damage occurs to the pump 122 and/or related equipment.

It should be appreciated that the system 100 may analyze any suitable combination of any of the sensor data described herein in order to generate derived data, determine fault information (e.g., type/severity/cause of fault, prescriptive recommendations, etc.), and/or perform one or more other functions described herein depending on the particular embodiment. It should be further appreciated that, in some embodiments, the cloud server 106 (and/or another device(s) of the system 100) may apply and/or leverage machine learning in order to analyze the real-time sensor data, determine fault information (e.g., type/severity/cause of fault, prescriptive recommendations, etc.), and/or perform one or more other functions described herein. In embodiments leveraging machine learning, it should be appreciated that the cloud server 106 and/or other device(s) of the system 100 may utilize any inputs, machine learning model, and/or machine learning algorithm suitable for performing the functions described herein. For example, in some embodiments, the cloud server 106 and/or other device(s) of the system 100 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, rule-based algorithms, ensemble algorithms, and/or other suitable machine learning algorithms, techniques, and/or mechanisms. Further, in some embodiments, the cloud server 106 and/or other device(s) of the system 100 may make the various determinations described herein further based on additional information including, for example, historical data, contextual data, and/or other relevant information).

If the cloud server 106 determines, in block 406, that the real-time sensor data is not outside of the threshold bounds, or in response to completion of block 408, the method 400 advances to block 418 in which the cloud server 106 determines the real-time operating point of the pump 122 on the pump performance curve based on the real-time sensor data. In block 420, the cloud server 106 transmits the real-time operating point of the pump 122 on the pump performance curve and the fault information (e.g., the type, severity, cause, and/or prescriptive recommendations) to the administrative device 108. Further, the cloud server 106 may also transmit the real-time sensor data or a portion thereof to the administrative device 108. As such, in other embodiments, the administrative device 108 may determine the real-time operating point of the pump 122 based on the real-time sensor data. In block 422, the administrative device 108 displays the real-time operating point of the pump 122 on the pump performance curve and the fault information received from the cloud server 106 in real time on a graphical user interface of the administrative device 108. The method 400 returns to block 402 in which the cloud server 106 continues to receive real-time sensor data. In other words, the cloud server 106 continually receives and analyzes sensor data in accordance with the method 400 of FIG. 4 such that the graphical user interface of the administrative device 108 may be updated to reflect the accurate sensor data, the real-time operating point of the pump 122 on the performance curve, and/or the relevant warning or alert messages. It should be appreciated that the fault information and/or sensor data may be displayed on a graphical user interface of the administrative device 108 in any suitable format (e.g., as gauges, bar graphs, spectrum graphs, data tables, etc.).

It should be appreciated that, in some embodiments, the system 100 may be further configured receive feedback indicating that one or more conditions (e.g., associated with the displayed fault information) has been corrected. In such embodiments, it should be appreciated that the real-time operating point of the pump 122 on the performance curve may be updated to reflect the change in the pump 122 dynamics. Further, in some embodiments, the system 100 may be configured to display a new alert indicative of the corrective active on the graphical user interface of the administrative device 108.

Although the blocks 402-422 are described in a relatively serial manner, it should be appreciated that various blocks of the method 400 may be performed in parallel in some embodiments.

It should be appreciated that, in the illustrative embodiment, sensor data and/or calculated data (e.g., data derived from sensor inputs or otherwise) may be used to display various rotating apparatus character curves (e.g., in real time). For example, various embodiments of rotating apparatus characteristic curves may include performance curves (e.g., including H-Q curve), efficiency curves (e.g., hydraulic, electrical, mechanical, and/or a combination thereof), NPSHr curves, power consumption curves, and/or other characteristic curves (e.g., including curves based on one or more of the sensor data described herein). Further, in some embodiments, sensor data and/or data derived therefrom (and/or other data) may be used to display system resistance curves with respect to rotating apparatus characteristic curves. It should be further appreciated that the techniques described herein may be employed to display characteristic curves on a graphical user interface, and such curves may be calculated, generated, determined, and/or otherwise based on any combination of the sensor data, system characteristics, derived/calculated data, historical data, contextual data, and/or other data/information described herein depending on the particular embodiment. As such, in some embodiments, the prescriptive messaging and display of representative curves described herein may include, for example, derived data.

FIGS. 6-11 illustrate various possible states of a graphical user interface of the administrative device 108 as described herein. In particular, FIGS. 6-11 illustrate possible changes to the graphical user interface that could occur as one or more measured parameters of the pump 122 change over time. It should be appreciated, however, that FIGS. 6-11 are provided merely as examples and various other pump conditions and fault conditions may be depicted on the graphical user interface in other embodiments.

Figure 6:
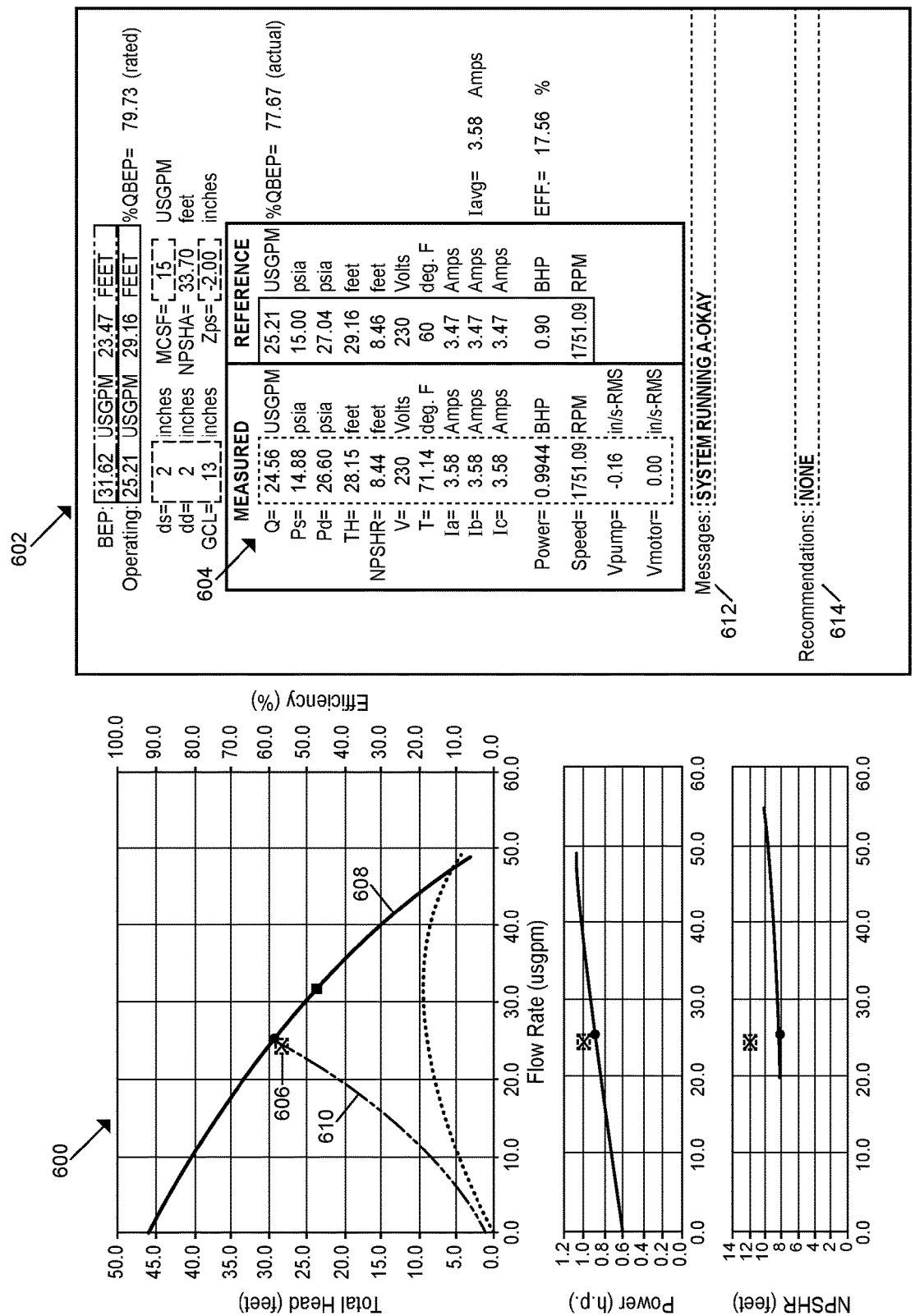

As shown in FIG. 6, the illustrative graphical user interface includes a graph 600 that depicts the real-time operating point of the pump 122 on the performance curve of the pump 122 and also includes a table 602 that depicts the real-time values of various pump parameters sensed by the sensors 124. During pump operation, the measured values may be depicted in the table 602 under the word "measured" or other suitable indicia. Further, as depicted in reference to FIG. 5, it should be appreciated that the real-time sensor data may be depicted in other suitable forms. As reflected in the graph 600 of FIG. 6, the real-time operating point 606 of the pump 122 is at the intersection the head versus flow rate curve 608 and the system resistance curve 610. Because the pump 122 is operating under normal conditions, the table 602 does not include any significant messages 612 or prescriptive recommendations 614.

Figure 7:
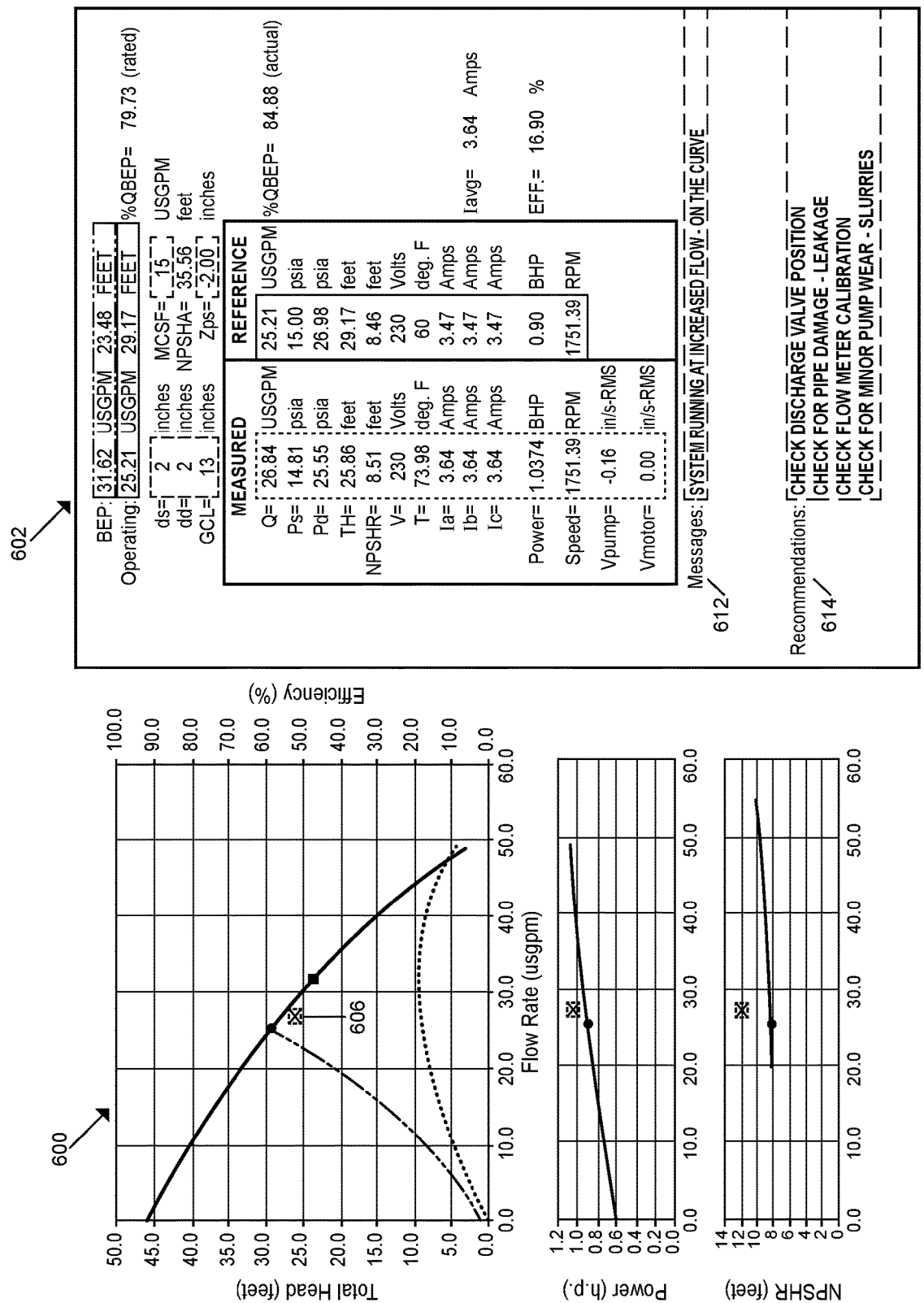

Suppose something occurs in the pump 122 that causes the flow rate to increase beyond its normal preset range. As shown in FIG. 7, the operating point 606 of the pump 122 on the graph 600 moves in real-time to depict a higher flow rate. When the flow rate exceeds the threshold for normal operation, a message 612 appears to inform the operator of the increased flow (e.g., "system running at increased flow"). Although there are no warnings associated with the small increase in flow rate in the illustrative embodiment, the table 602 provides several prescriptive recommendations 614 to the operator in order to address the fault (e.g., "check discharge valve position," "check for pipe damage—leakage," "check flow meter calibration," "check for minor pump wear—slurries")

Figure 8:
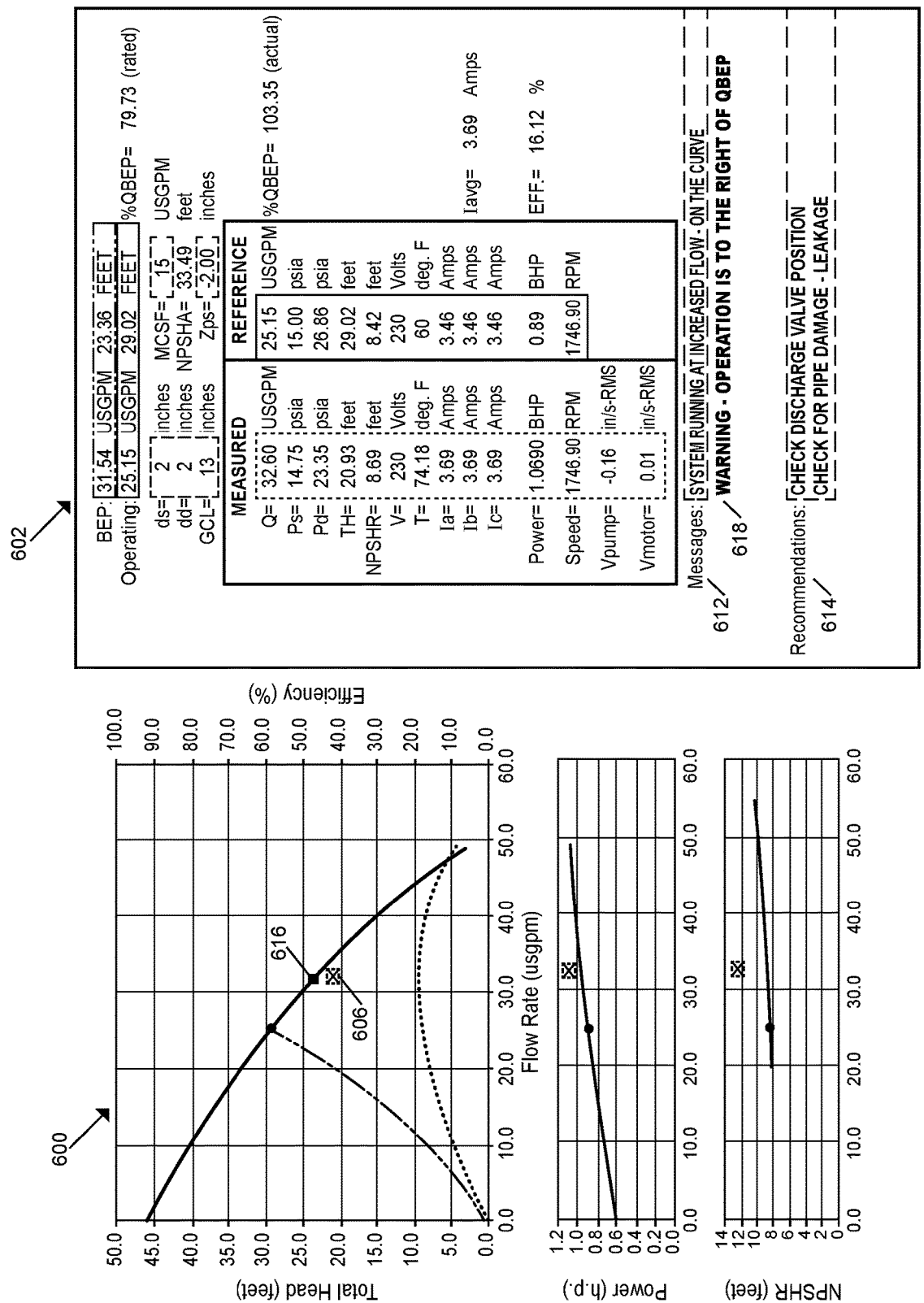

As the flow rate continues to increase, it should be appreciated that the messages 612 and prescriptive recommendations 614 change accordingly as depicted in FIG. 8. Further, in the illustrative embodiment, when the best efficiency flow rate 616 on the curve is exceeded, a warning 618 may also appear (e.g., "warning—operating is to the right of QBEP") in addition to the messages 612 (e.g., "system running at increased flow") and prescriptive recommendations 614 (e.g., "check discharge valve position," "check for pipe damage—leakage"). It should be appreciated that the best efficiency flow rate 616 is the flow rate corresponding the peak pump efficiency and is a relevant reference point for pump operation. Typically, pumps 122 operate at flow rates below the best efficiency point 616 as a best practice.

Figure 9:
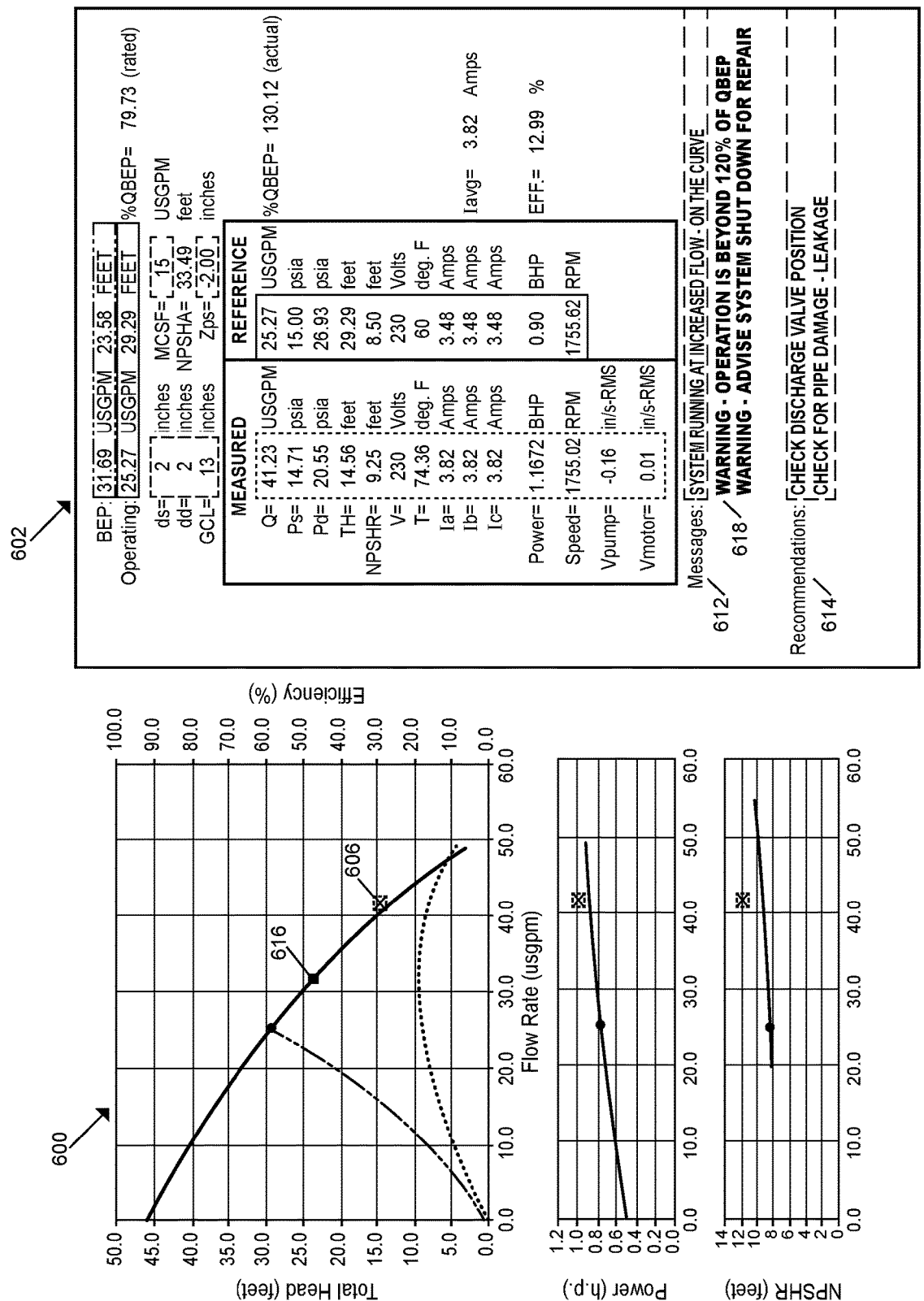
Figure 10:
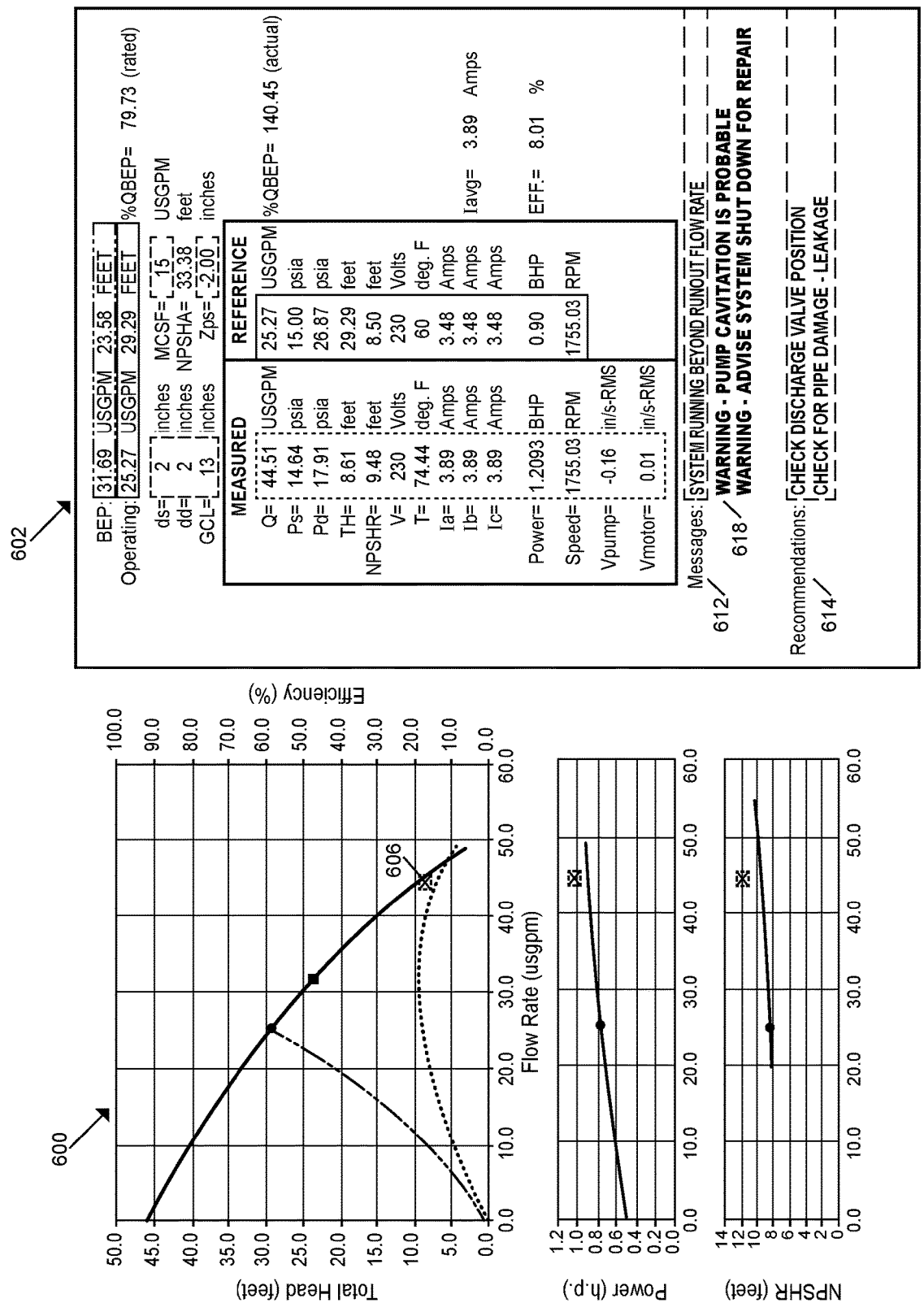

Suppose a discharge pipe were to burst, for example, and there was no longer any back pressure on the pump 122. In such circumstances, the pump 122 would try to pump as much fluid as possible and the pump's operating point would effectively "run off" the end of the performance curve as depicted in FIGS. 9-10. A burst pipe is a dangerous condition for pump operation as significant mechanical damage could be done to the pump 122 and/or ancillary components. As such, as shown in FIG. 9, further warnings 618 may appear on the table 602 indicating to shut down the pump 122 when the flow rate exceeds 120% of the best efficiency flow rate 616 (e.g., "warning—operation is beyond 120% of QBEP," "warning—advise system shut down for repair"). Further, as shown in FIG. 10, as the flow rate approaches the end of the curve, cavitation may occur, as the head generated by the pump 122 becomes less than the required net positive suction head. Accordingly, an additional warning 618 may be provided to indicate that cavitation is probable (e.g., "warning—pump cavitation is probable").

Figure 11:
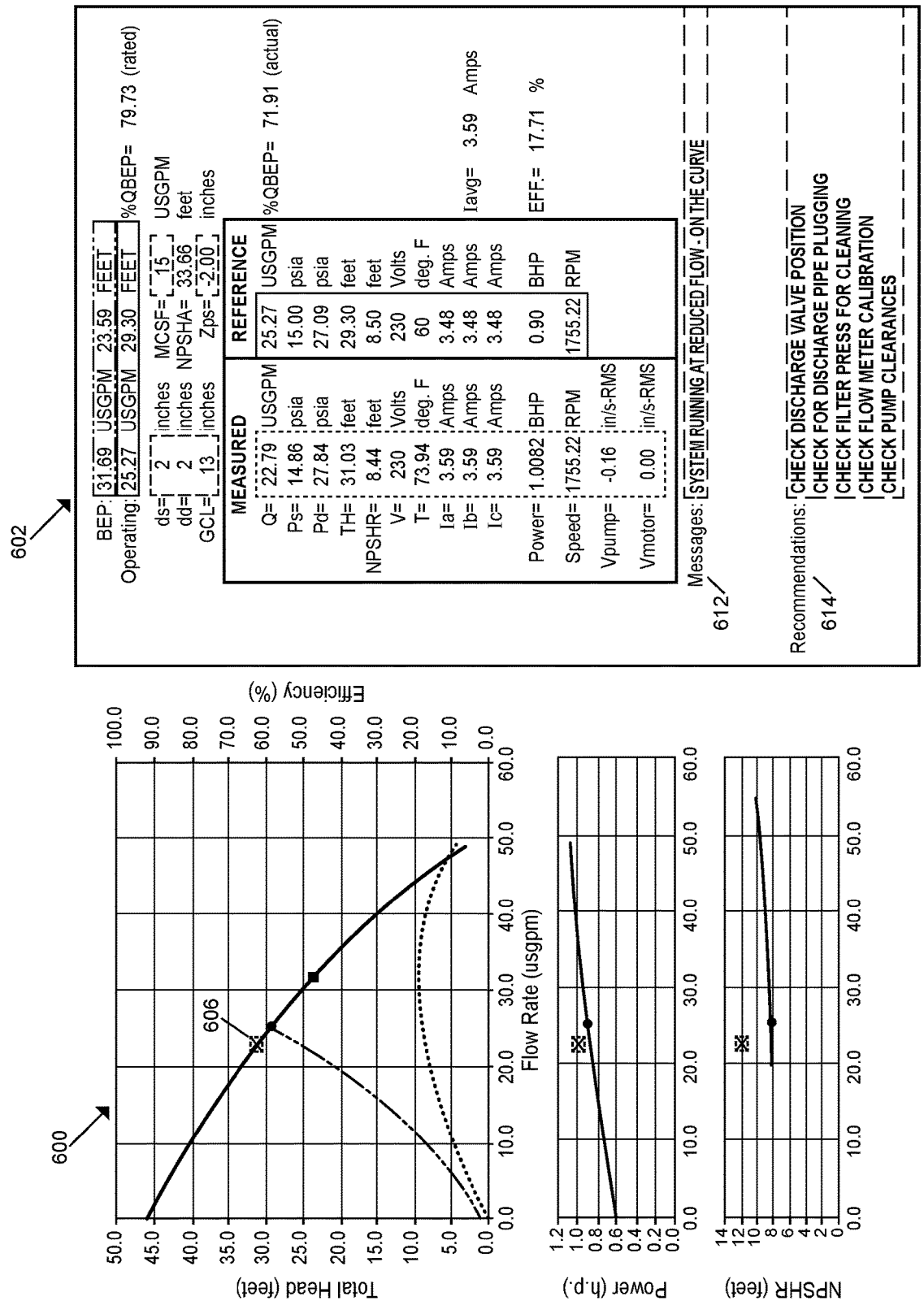

Suppose instead that the flow rate of the pump 122 decreased beyond its normal preset range. As shown in FIG. 11, the operating point 606 of the pump 122 on the graph 600 moves in real-time to depict the lower flow rate. When the flow rate falls below the threshold for normal operation, a message 612 appears to inform the operator of the decreased flow (e.g., "system running at reduced flow"). Additionally, several prescriptive recommendations 614 are provided to the operator in order to address the fault (e.g., "check discharge valve position," "check for discharge pipe plugging," "check filter press for cleaning," "check flow meter calibration," "check pump clearances").

According to an embodiment, a method of performing real-time pump monitoring with prescriptive analytics includes receiving real-time sensor data from a plurality of pump sensors, wherein each pump sensor of the plurality of pump sensors is configured to generate sensor data associated with at least one characteristic of the pump's operation, comparing the real-time sensor data to at least one threshold value, determining fault information in response to determining the real-time sensor data is outside of one or more of the at least one threshold value, determining a real-time operating point of the pump on a pump performance curve associated with the pump based on the real-time sensor data, displaying, on a graphical user interface of an administrative device, the real-time operating point of the pump on the pump performance curve, and displaying, on the graphical user interface of the administrative device, the fault information in real time.

In some embodiments, determining the fault information may include determining a type of fault associated with the real-time sensor data being outside of the one or more of the at least one threshold value.

In some embodiments, determining the fault information may include determining a severity of the fault.

In some embodiments, determining the fault information may include determining a potential cause of the fault.

In some embodiments, determining the fault information may include determining at least one prescriptive recommendation to address the fault.

In some embodiments, determining the fault information may include determining the fault information by a server, the method may further include transmitting the fault information from the server to the administrative device, and displaying the fault information on the graphical user interface of the administrative device may include displaying at least a portion of the fault information received from the server.

In some embodiments, the plurality of pump sensors may include at least one of a pressure sensor, a flow meter, an inertial sensor, an electrical sensor, or an environmental sensor.

In some embodiments, the method may further include updating, on the graphical user interface, display of the fault information in real time in response to determining that the fault information has changed.

In some embodiments, displaying the fault information may include displaying at least one of a warning message or a prescriptive recommendation to address the fault.

In some embodiments, one or more non-transitory machine readable storage media comprising a plurality of instructions stored thereon that, in response to execution by at least one processor, causes the at least one processor to perform real-time pump monitoring with prescriptive analytics includes receiving real-time sensor data from a plurality of pump sensors, wherein each pump sensor of the plurality of pump sensors is configured to generate sensor data associated with at least one characteristic of the pump's operation, compare the real-time sensor data to at least one threshold value, determine fault information in response to determining the real-time sensor data is outside of one or more of the at least one threshold value, determine a real-time operating point of the pump on a pump performance curve associated with the pump based on the real-time sensor data, display, on a graphical user interface of an administrative device, the real-time operating point of the pump on the pump performance curve, and display, on the graphical user interface of the administrative device, the fault information in real time.

According to another embodiment, a system for real-time pump monitoring with prescriptive analytics may include a pump system, a server, and an administrative device. The pump system may include a plurality of pump sensors, wherein each pump sensor of the plurality of pump sensors is configured to generate sensor data associated with at least one characteristic of the pump's operation. The server may be configured to receive real-time sensor data generated by the plurality of pump sensors, compare the real-time sensor data to at least one threshold value, determine fault information in response to a determination that the real-time sensor data is outside of one or more of the at least one threshold value, and determine a real-time operating point of the pump on a pump performance curve associated with the pump based on the real-time sensor data. The administrative device may include a display device for display of a graphical user interface and may be configured to display the real-time operating point of the pump on the pump performance curve on the graphical user interface and display the fault information on the graphical user interface in real time.

In some embodiments, the fault information may include a type of fault associated with the real-time sensor data being outside of the one or more of the at least one threshold value.

In some embodiments, the fault information may include a severity of the fault.

In some embodiments, the fault information may include a potential cause of the fault.

In some embodiments, the fault information may include at least one prescriptive recommendation to address the fault.

In some embodiments, the plurality of pump sensors may include at least one of a pressure sensor, a flow meter, an inertial sensor, an electrical sensor, or an environmental sensor.

In some embodiments, the administrative device may be further configured to update, on the graphical user interface, display of the fault information in real time in response to a determination that the fault information has changed.

According to yet another embodiment, a system may include at least one processor and at least one memory comprising a plurality of instructions stored therein that, in response to execution by the at least one processor, causes the system to receive real-time sensor data generated by a plurality of pump sensors, compare the real-time sensor data to at least one threshold value, determine fault information in response to a determination that the real-time sensor data is outside of one or more of the at least one threshold value, determine a real-time operating point of the pump on a pump performance curve associated with the pump based on the real-time sensor data, and transmit the real-time operating point of the pump on the pump performance curve and the fault information to an administrative device for display on the administrative device in real time.

In some embodiments, the fault information may include a type of fault associated with the real-time sensor data being outside of the one or more of the at least one threshold value, a severity of the fault, a potential cause of the fault, and at least one prescriptive recommendation to address the fault.

In some embodiments, the plurality of pump sensors may include at least one of a pressure sensor, a flow meter, an inertial sensor, an electrical sensor, or an environmental sensor.

What is claimed is:

1. A method of performing real-time pump monitoring with prescriptive analytics, the method comprising:
   receiving, at a cloud server, real-time sensor data from a plurality of pump sensors of a pump control system, wherein each pump sensor of the plurality of pump sensors is configured to generate sensor data associated with at least one characteristic of operation of a pump;
   analyzing and processing, at the cloud server by a leverage machine learning algorithm, the real-time sensor data to generate a derived real-time sensor data;
   comparing, at the cloud server by the leverage machine learning algorithm, the derived real-time sensor data to at least one threshold value, wherein the at least one threshold value includes a dynamically updated threshold value;
   determining, at the cloud server by a leverage machine learning algorithm, fault information in response to determining the derived real-time sensor data is outside of one or more of the at least one threshold value;
   in response to the determining of fault information, determining, at the cloud server by the leverage machine learning algorithm, a real-time operating point of the pump on a pump performance curve based on the derived real-time sensor data;
   displaying, on a graphical user interface of an administrative device, the real-time operating point of the pump on the pump performance curve; and
   displaying, on the graphical user interface of the administrative device, the fault information in real time.

2. The method of claim 1, wherein determining the fault information comprises determining a type of fault associated with the derived real-time sensor data being outside of the one or more of the at least one threshold value.

3. The method of claim 2, wherein determining the fault information comprises:
   determining a severity of the fault that distinguishes between (a) a fault that requires an immediate forced shutdown to prevent damage to the pump and (b) a fault whose remediation can be delayed without damage to the pump until later preventative maintenance.

4. The method of claim 3, wherein determining the fault information comprises determining a potential cause of the fault.

5. The method of claim 4, wherein determining the fault information comprises determining at least one prescriptive recommendation to address the fault.

6. The method of claim 1, further comprising transmitting the fault information from the cloud server to the administrative device; and
   wherein displaying the fault information on the graphical user interface of the administrative device comprises displaying at least a portion of the fault information received from the cloud server.

7. The method of claim 1, wherein the plurality of pump sensors comprises at least one of a pressure sensor, a flow meter, an inertial sensor, an electrical sensor, or an environmental sensor.

8. The method of claim 1, further comprising:
updating, on the graphical user interface, display of the fault information in real time in response to determining that the fault information has changed.

9. The method of claim 1, wherein displaying the fault information comprises displaying at least one of a warning message or a prescriptive recommendation to address the fault.

10. One or more non-transitory machine readable storage media comprising a plurality of instructions stored thereon that, in response to execution by at least one processor, causes the at least one processor to perform the method of claim 1.

11. A system for real-time pump monitoring with prescriptive analytics, the system comprising:
a pump system comprising a plurality of pump sensors of a pump control system, wherein each pump sensor of the plurality of pump sensors generate sensor data associated with at least one characteristic of operation of a pump of the pump system;
a cloud server to:
(i) receive real-time sensor data generated by the plurality of pump sensors,
analyze and process, by a leverage machine learning algorithm, the real-time sensor data to generate a derived real-time sensor data,
(ii) compare, by the leverage machine learning algorithm, the real-time sensor data to generate a derived real-time sensor data, the derived real-time sensor data to at least one threshold value,
(iii) determine, by the leverage machine learning algorithm, fault information in response to a determination that the derived real-time sensor data is outside of one or more of the at least one threshold value, and
(iv) determine, in response to the determining of fault information and by the leverage machine learning algorithm, a real-time operating point of the pump on a pump performance curve associated with the pump based on the real-time sensor data; and
an administrative device comprising a display device for display of a graphical user interface and configured to:
(i) display, in real time, the real-time operating point of the pump on the pump performance curve on the graphical user interface and
(ii) display the fault information on the graphical user interface in real time.

12. The system of claim 11, wherein the fault information comprises a type of fault associated with the derived real-time sensor data being outside of the one or more of the at least one threshold value.

13. The system of claim 12, wherein the fault information comprises a severity of the fault that distinguishes between (a) a fault that requires an immediate forced shutdown to prevent damage to the pump and (b) a fault whose remediation can be delayed without damage to the pump until later preventative maintenance.

14. The system of claim 13, wherein the fault information comprises a potential cause of the fault.

15. The system of claim 14, wherein the fault information comprises at least one prescriptive recommendation to address the fault.

16. The system of claim 11, wherein the plurality of pump sensors comprises at least one of a pressure sensor, a flow meter, an inertial sensor, an electrical sensor, or an environmental sensor.

17. The system of claim 11, wherein the administrative device is further configured to update, on the graphical user interface, display of the fault information in real time in response to a determination that the fault information has changed.

18. A system, comprising:
at least one processor; and
at least one memory comprising a plurality of instructions stored therein that, in response to execution by the at least one processor, causes the system to:
receive, at a cloud server, real-time sensor data generated by a plurality of pump sensors of a pump control system, wherein each pump sensor of the plurality of pump sensors is configured to generate sensor data associated with at least one characteristic of operation of a pump;
analyze and process, at the cloud server by a leverage machine learning algorithm, the real-time sensor data to generate a derived real-time sensor data;
compare, at the cloud server by the leverage machine learning algorithm, the derived real-time sensor data to at least one threshold value;
determine, at the cloud server by a leverage machine learning algorithm, fault information in response to a determination that the derived real-time sensor data is outside of one or more of the at least one threshold value;
determine, in response to the determining of fault information and by the leverage machine learning algorithm, a real-time operating point of the pump on a pump performance curve based on the real-time sensor data;
transmit the real-time operating point of the pump on the pump performance curve and the fault information to an administrative device for display on the administrative device in real time.

19. The system of claim 18, wherein the fault information comprises (i) a type of fault associated with the derived real-time sensor data being outside of the one or more of the at least one threshold value, (ii) a severity of the fault that distinguishes between (a) a fault that requires an immediate forced shutdown to prevent damage to the pump and (b) a fault whose remediation can be delayed without damage to the pump until later preventative maintenance, (iii) a potential cause of the fault, and (iv) at least one prescriptive recommendation to address the fault.

20. The system of claim 18, wherein the plurality of pump sensors comprises at least one of a pressure sensor, a flow meter, an inertial sensor, an electrical sensor, or an environmental sensor.

\* \* \* \* \*